(12) United States Patent
Albero et al.

(10) Patent No.: US 11,240,272 B2
(45) Date of Patent: Feb. 1, 2022

(54) USER RESPONSES TO CYBER SECURITY THREATS

(71) Applicant: Bank of America Corporation, Charlotte, NC (US)

(72) Inventors: George Albero, Charlotte, NC (US); Michael Beveridge, Charlotte, NC (US); Edward Lee Traywick, Charlotte, NC (US); Elizabeth R. Liuzzo, Charlotte, NC (US); Caleb G. Mann, Charlotte, NC (US); David Joseph Walsh, Fort Mill, SC (US); Daniel Martin, Fort Mill, SC (US); Cody Searl, Pineville, NC (US); Paul Swiencicki, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 16/520,971

(22) Filed: Jul. 24, 2019

(65) Prior Publication Data
US 2021/0029164 A1     Jan. 28, 2021

(51) Int. Cl.
*H04L 9/00*     (2006.01)
*H04L 29/06*     (2006.01)

(52) U.S. Cl.
CPC .......... *H04L 63/20* (2013.01); *H04L 63/1416* (2013.01); *H04L 63/1433* (2013.01); *H04L 63/1483* (2013.01); *H04L 63/1491* (2013.01)

(58) Field of Classification Search
CPC .. H04L 63/20; H04L 63/1416; H04L 63/1433
USPC ........................................................ 726/23
See application file for complete search history.

(56) References Cited

U.S. PATENT DOCUMENTS

| | | |
|---|---|---|
| 8,484,741 B1 | 7/2013 | Chapman |
| 8,615,807 B1 | 12/2013 | Higbee et al. |
| 8,776,168 B1 * | 7/2014 | Gibson ................ H04L 63/102 726/1 |
| 9,053,326 B2 | 6/2015 | Higbee et al. |
| 9,224,117 B2 | 12/2015 | Chapman |
| 9,262,629 B2 | 2/2016 | Belani et al. |
| 9,729,573 B2 | 8/2017 | Gatti |
| 9,749,359 B2 | 8/2017 | Gatti |
| 9,881,271 B2 | 1/2018 | Chapman |
| 9,906,539 B2 | 2/2018 | Higbee et al. |
| 10,237,302 B1 * | 3/2019 | Kras ...................... H04L 67/22 |

(Continued)

*Primary Examiner* — Christopher J Brown
(74) *Attorney, Agent, or Firm* — Banner & Witcoff, Ltd.

(57) ABSTRACT

Aspects of the disclosure relate to improving user responses to cyber security threats. A computing platform may generate a test communication to simulate a potential cyber threat activity. Then, the computing platform may send, via the communication interface, the test communication to a user device associated with a target user. Then, the computing platform may receive, via the communication interface and from the user device, a response to the test communication. Subsequently, the computing platform may determine, based on the response, a threat awareness level for the target user, where the threat awareness level is indicative of a susceptibility of the target user to the potential cyber threat activity. Then, the computing platform may send, to the target user and based on the threat awareness level, an alert notification to counter the cyber threat activity.

25 Claims, 6 Drawing Sheets

(56) References Cited

U.S. PATENT DOCUMENTS

| | | |
|---|---|---|
| 10,243,904 B1 | 3/2019 | Wescoe et al. |
| 2015/0229664 A1* | 8/2015 | Hawthorn ........... H04L 63/1433 726/25 |
| 2016/0380936 A1* | 12/2016 | Gunasekara ......... G06Q 10/107 709/206 |
| 2017/0026388 A1 | 1/2017 | Gatti |

* cited by examiner

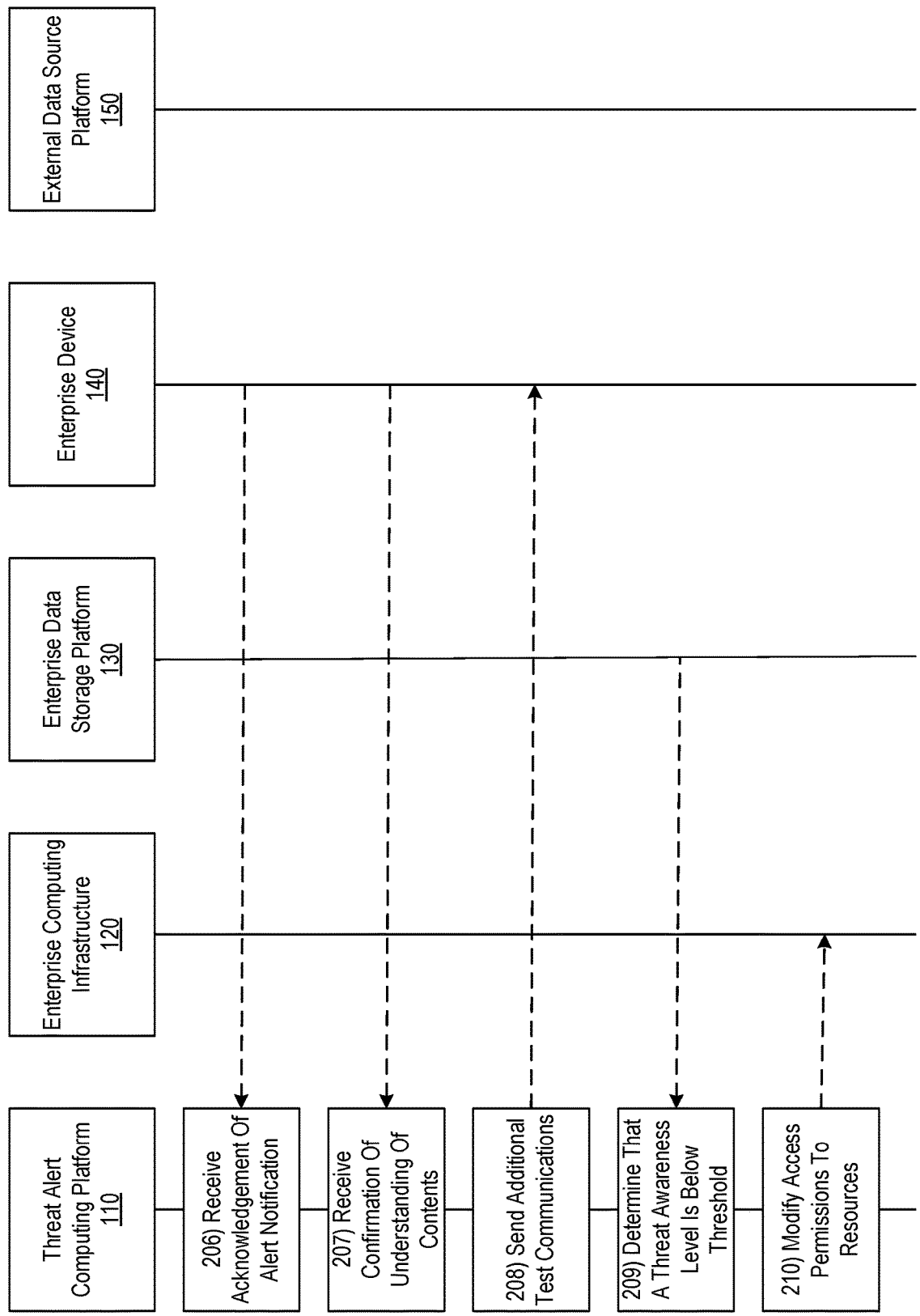

USER RESPONSES TO CYBER SECURITY THREATS

TECHNICAL FIELD

Aspects of the disclosure relate to deploying digital data processing systems to identifying and preventing cyber threat activities in an enterprise system. In particular, one or more aspects of the disclosure relate to improving user responses to cyber security threats.

BACKGROUND

Enterprise organizations may utilize various computing infrastructure to identify cyber security threats, identify susceptibility of enterprise users to such threats, and undertake steps to prevent and/or mitigate the impact of cyber threat activities. Such identifying and mitigating may need to be performed in a dynamic manner and may need to be tailored to individual assessments. In some instances, the identifying and mitigating may include confidential information and/or other sensitive data that is created, transmitted, and/or used for various purposes. Ensuring that anticipated cyber security threats are identified in advance, and timely and targeted remediation measures are taken to bolster cyber defense and minimize an impact to enterprise services, may be highly advantageous to prevention of actual cyber security threats. In many instances, however, it may be difficult to identify cyber security threats, identify susceptibility of enterprise users to such threats, and undertake steps to prevent and/or mitigate the impact of cyber threat activities with speed and accuracy while also attempting to optimize network resources, bandwidth utilization, and efficient operations of the computing infrastructure involved in performing such cyber defense activities.

SUMMARY

Aspects of the disclosure provide effective, efficient, scalable, fast, reliable, and convenient technical solutions that address and overcome the technical problems associated with improving user responses to cyber security threats.

In accordance with one or more embodiments, a computing platform having at least one processor, a communication interface, and memory may generate a test communication to simulate a potential cyber threat activity. Then, the computing platform may send, via the communication interface, the test communication to a user device associated with a target user. Then, the computing platform may receive, via the communication interface and from the user device, a response to the test communication. Subsequently, the computing platform may determine, based on the response, a threat awareness level for the target user, where the threat awareness level is indicative of a susceptibility of the target user to the potential cyber threat activity. Then, the computing platform may send, to the target user and based on the threat awareness level, an alert notification to counter the cyber threat activity.

In some embodiments, the test communication may be a web-based communication that includes a link to a web resource, and where receiving the response to the test communication includes detecting that the target user has clicked the link to the web resource.

In some embodiments, the computing platform may receive, from the target user, an acknowledgement of receipt of the alert notification. Then, the computing platform may receive, from the target user, a confirmation of reading and understanding contents of the alert notification.

In some embodiments, the computing platform may identify the target user based on historical responses to prior test communications.

In some embodiments, the computing platform may identify the target user based on an analysis of cyber threat intelligence information.

In some embodiments, the computing platform may send, to the target user and based on the threat awareness level and during a predetermined period of time, additional test communications emulating additional unauthorized communications associated with additional potential cyber threat activities. In some embodiments, the computing platform may determine, based on the threat awareness level for the target user, a frequency of sending the additional test communications.

In some embodiments, the computing platform may determine that the threat awareness level associated with the target user is below a threshold during a period of time. Then, the computing platform may modify access permissions, applicable to the target user, to one or more enterprise resources.

In some embodiments, the computing platform may customize, based on a type of the cyber threat activity, the alert notification.

In some embodiments, the test communication may be an electronic mail, and the response to the test communication may include detecting that the target user has deleted the electronic mail.

In some embodiments, the test communication may be an electronic mail, and the response to the test communication may include detecting that the target user has not responded to the electronic mail.

In some embodiments, the test communication may be a telephone call, and the response to the test communication may include detecting that the target user has not responded to the telephone call.

In some embodiments, the computing platform may generate the test communication based on cyber threat intelligence information.

In some embodiments, the computing platform may analyze cyber threat intelligence information. Then, the computing platform may apply, based on the analyzing, predictive analysis to identify anticipated cyber threat activity.

In some embodiments, the computing platform may apply machine learning techniques to identify effective strategies to counter cyber threat activities.

In some embodiments, the potential cyber threat activity may include one or more of a phishing activity, a smishing activity, a spear phishing activity, a vishing activity, a cloned phishing activity, and a whaling activity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for improving user responses to cyber security threats in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to improving user responses to cyber security threats. Enterprise organizations may be vulnerable to a variety internal and external cyber security threats. For example, there may be threats from technology dependencies, from malicious campaigns targeting an enterprise and/or a wider industry sector, direct threats to an enterprise organization or a geographic region, and so forth. Also, for example, an enterprise organization, such as a financial institution, may be vulnerable to malicious campaigns targeting customer assets and/or confidential information. Also, for example, enterprise organizations may generally include thousands of employees located in geographically diverse locations, including remote locations, and/or locations in foreign countries. Accordingly, identifying and responding to such threats while also attempting to optimize network resources, bandwidth utilization, and efficient operations of the computing infrastructure involved in performing such cyber threat related activities may pose a significant challenge to enterprise organizations. Accordingly, adopting robust cyber defense measures may be significantly advantageous to a running of a successful enterprise.

For example, an enterprise organization may simulate a cyber security threat to identify vulnerabilities in its cyber defense strategy, and adopt appropriate measures to diminish an impact of such vulnerabilities. Depending on a threat landscape, the enterprise organization may need to rapidly communicate with enterprise computing devices to relay alert notifications and ensure compliance. Fast data transmission rates, accuracy of location data, and availability of multiple simultaneous communication channels may be advantageous in sending such time-sensitive alert notifications.

Figure 1A:
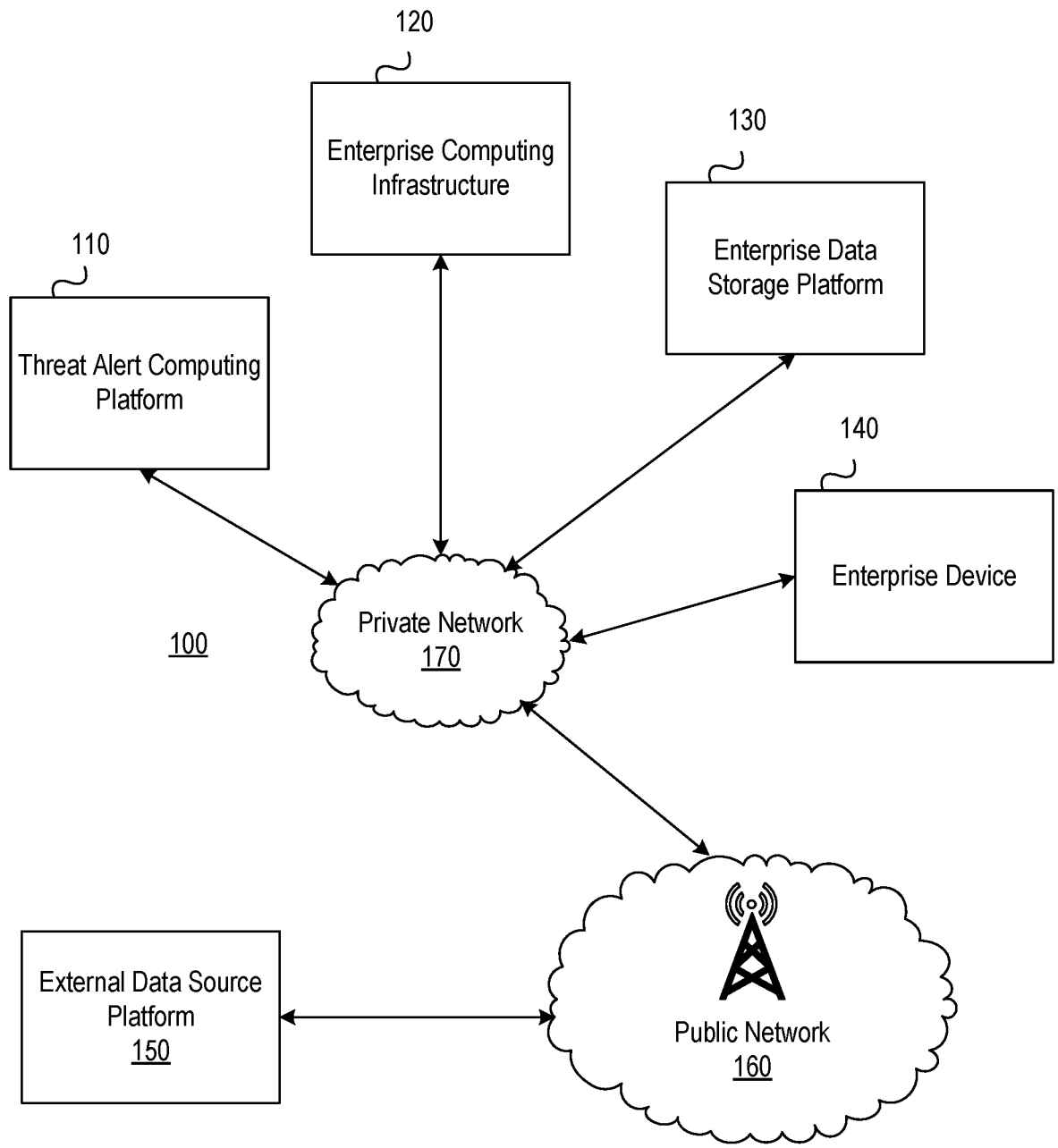
FIGS. 1A and 1B depict an illustrative computing environment for improving user responses to cyber security threats in accordance with one or more example embodiments.
Figure 1B:
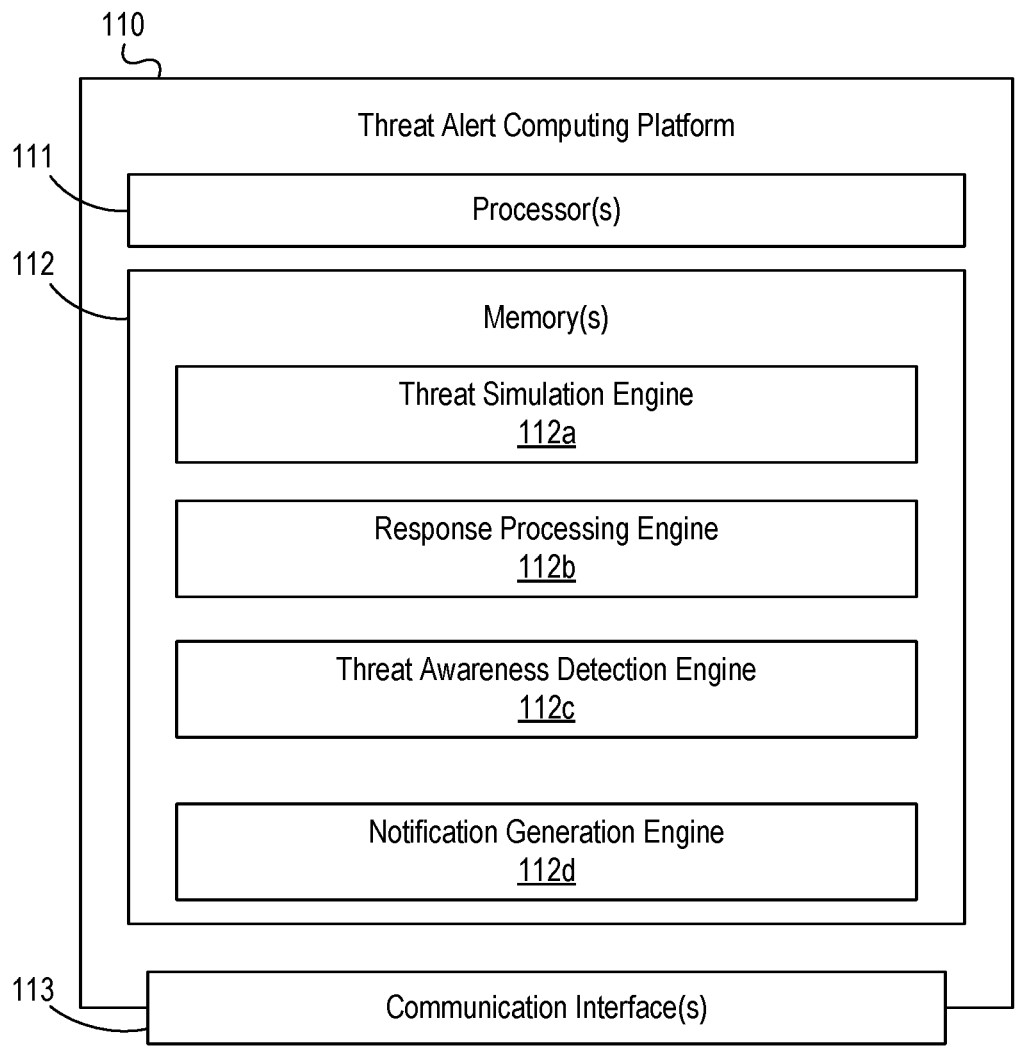

FIGS. 1A and 1B depict an illustrative computing environment for improving user responses to cyber security threats in accordance with one or more example embodiments. Referring to FIG. 1A, computing environment 100 may include one or more computer systems. For example, computing environment 100 may include threat alert computing platform 110, enterprise computing infrastructure 120, enterprise data storage platform 130, enterprise device 140, and external data source platform 150.

As illustrated in greater detail below, threat alert computing platform 110 may include one or more computing devices configured to perform one or more of the functions described herein. For example, threat alert computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide an enterprise mobile application for user devices, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute tasks on specific accounts based on commands and/or other information received from other computer systems included in computing environment 100. Additionally, or alternatively, enterprise computing infrastructure 120 may receive instructions from threat alert computing platform 110 and execute the instructions in a timely manner. Additionally, or alternatively, enterprise computing infrastructure 120 may receive cyber threat intelligence information from external data source platform 150 and analyze the information in a timely manner. Also, for example, enterprise computing infrastructure 120 may identify one or more threats to the infrastructure emanating from an external cyber threat source, and adopt measures to counter the one or more threats in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. Additionally, or alternatively, enterprise computing infrastructure 120 may be configured to store and/or otherwise maintain user data. For example, enterprise computing infrastructure 120 may be configured to store and/or otherwise maintain cyber threat related response activities associated with users, historical data related to such response activities, location data of computing devices, and so forth. Additionally, or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Enterprise device 140 may be a personal computing device (e.g., desktop computer, laptop computer) or mobile computing device (e.g., smartphone, tablet). In addition, enterprise device 140 may be linked to and/or used by a specific enterprise user (who may, e.g., be an employee or other affiliate of an enterprise organization operating threat alert computing platform 110). In some instances, enterprise device 140 may be located at an enterprise facility.

External data source platform 150 may include one or more computing devices and/or other computer components (e.g., processors, memories, communication interfaces). In addition, and as illustrated in greater detail below, external data source platform 150 may store, update, and/or otherwise maintain cyber threat intelligence related data. Additionally, or alternatively, enterprise computing infrastructure 120 may be configured to communicate with external data source platform 150 to access, and/or update cyber threat related data. Also, for example, external data source platform 150 may store and/or otherwise maintain cyber threat related activities across industry sectors, and activities that affect groups of companies. As another example, external data source platform 150 may store and/or otherwise maintain typical strategies, tools, actors, campaigns, tactics, and so forth related to cyber threat related activities. Additionally, or alternatively, enterprise computing infrastructure 120 may load data from external data source platform 150, manipulate and/or otherwise process such data, and return modified data and/or other data to external data source platform 150 and/or to other computer systems included in computing environment 100.

Computing environment 100 also may include one or more networks, which may interconnect one or more of threat alert computing platform 110, enterprise computing infrastructure 120, enterprise data storage platform 130, enterprise device 140, external data source platform 150. For example, computing environment 100 may include private network 170 (which may interconnect, for example, threat alert computing platform 110, enterprise computing infrastructure 120, enterprise data storage platform 130, enterprise device 140, and/or one or more other systems which may be associated with an organization, such as a financial institution) and public network 160 (which may interconnect, for example, external data source platform 150 with private network 170 and/or one or more other systems, public networks, sub-networks, and/or the like). Public network 160 may be a high generation cellular network, such as, for example, a fifth generation ("5G") or higher cellular network. In some embodiments, private network 170 may likewise be a high generation cellular enterprise network, such as, for example, a 5G or higher cellular network.

Cellular networks are generally associated with service areas that are subdivided into cells. Location data for devices are based on the cell within which the device is located. Accordingly, smaller cells provide greater accuracy and reliability of location data. High generation cellular networks, such as a 5G cellular network, may be configured to considerably reduce the cell size, thereby improving accuracy of location data. Also, for example, in high generation cellular networks, each cell may be equipped with multiple antennas configured to communicate with the device within the cell so that multiple streams of data may be simultaneously transmitted, thereby increasing data transmission rates, reducing backlog due to network traffic, and enhancing speed and accuracy of communications.

In one or more arrangements, enterprise computing infrastructure 120, enterprise data storage platform 130, enterprise device 140, and external data source platform 150, and/or the other systems included in computing environment 100 may be any type of computing device capable of communicating with a user interface, receiving input via the user interface, and communicating the received input to one or more other computing devices. For example, enterprise computing infrastructure 120, enterprise data storage platform 130, enterprise device 140, and external data source platform 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of threat alert computing platform 110, enterprise computing infrastructure 120, enterprise data storage platform 130, enterprise device 140, and external data source platform 150, may, in some instances, be special-purpose computing devices configured to perform specific functions.

Referring to FIG. 1B, threat alert computing platform 110 may include one or more processors 111, memory 112, and communication interface 113. A data bus may interconnect processor 111, memory 112, and communication interface 113. Communication interface 113 may be a network interface configured to support communication between threat alert computing platform 110 and one or more networks (e.g., public network, private network, a local network, or the like). Memory 112 may include one or more program modules having instructions that when executed by processor 111 cause threat alert computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of threat alert computing platform 110 and/or by different computing devices that may form and/or otherwise make up threat alert computing platform 110. For example, memory 112 may have, store, and/or include threat simulation engine 112a, response processing engine 112b, threat awareness detection engine 112c, and notification generation engine 112d. Threat simulation engine 112a may have instructions that direct and/or cause threat alert computing platform 110 to generate a test communication to simulate a potential cyber threat activity directed at an enterprise organization associated with enterprise computing infrastructure 120, as discussed in greater detail below. In some embodiments, threat simulation engine 112a may have instructions that direct and/or cause threat alert computing platform 110 to send, via the communication interface, the test communication to a user device (e.g., enterprise device 140) associated with a target user. Response processing engine 112b may have instructions that direct and/or cause threat alert computing platform 110 to, receive, via the communication interface and from the user device (e.g., enterprise device 140), a response to the test communication. Threat awareness detection engine 112c may have instructions that direct and/or cause threat alert computing platform 110 to determine, based on the response, a threat awareness level for the target user, where the threat awareness level is indicative of a susceptibility of the target user to the potential cyber threat activity. Notification generation engine 112d may have instructions that direct and/or cause threat alert computing platform 110 to send, to the target user and based on the threat awareness level, an alert notification to counter the cyber threat activity.

Figure 2A:
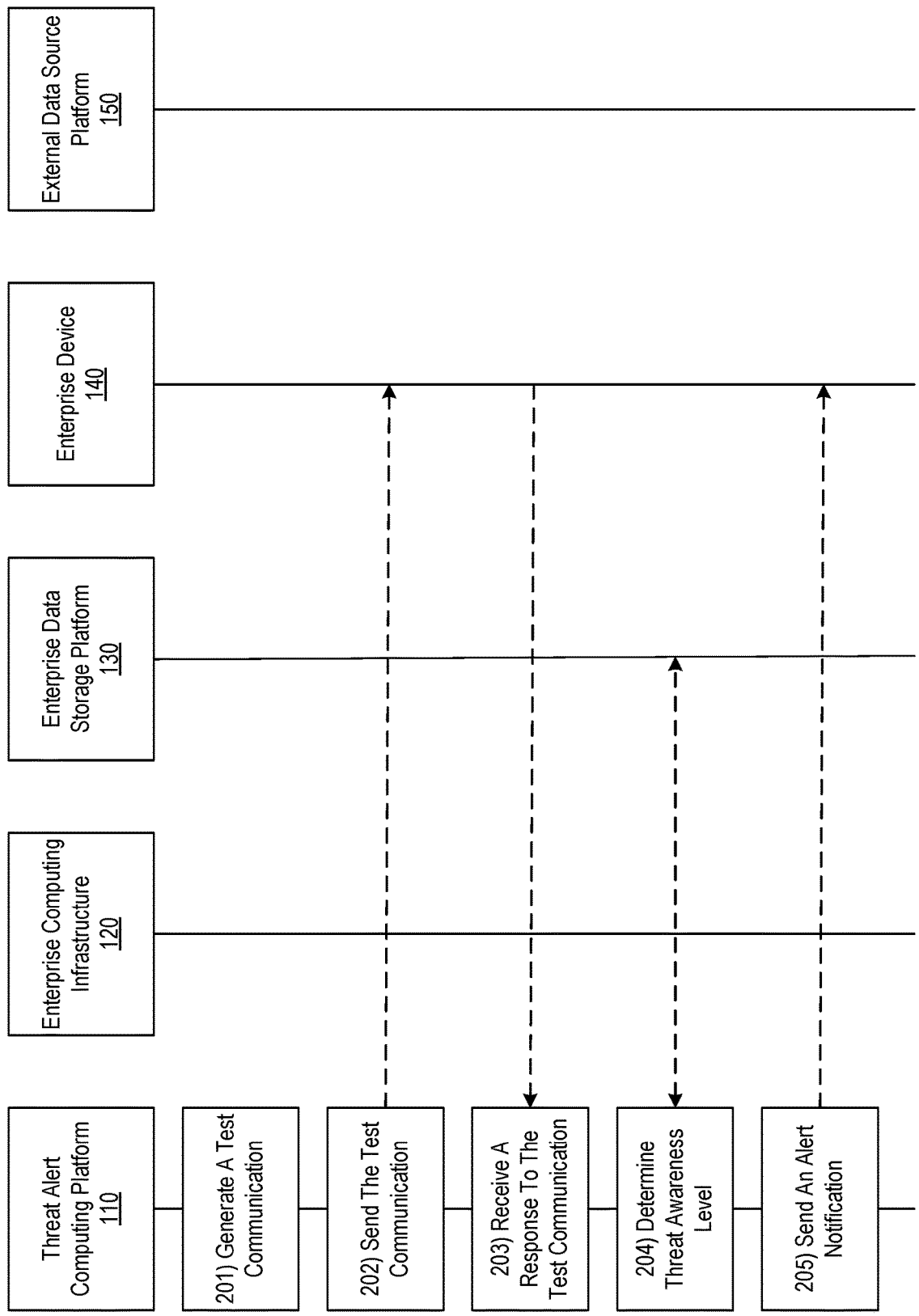
Figure 2C:
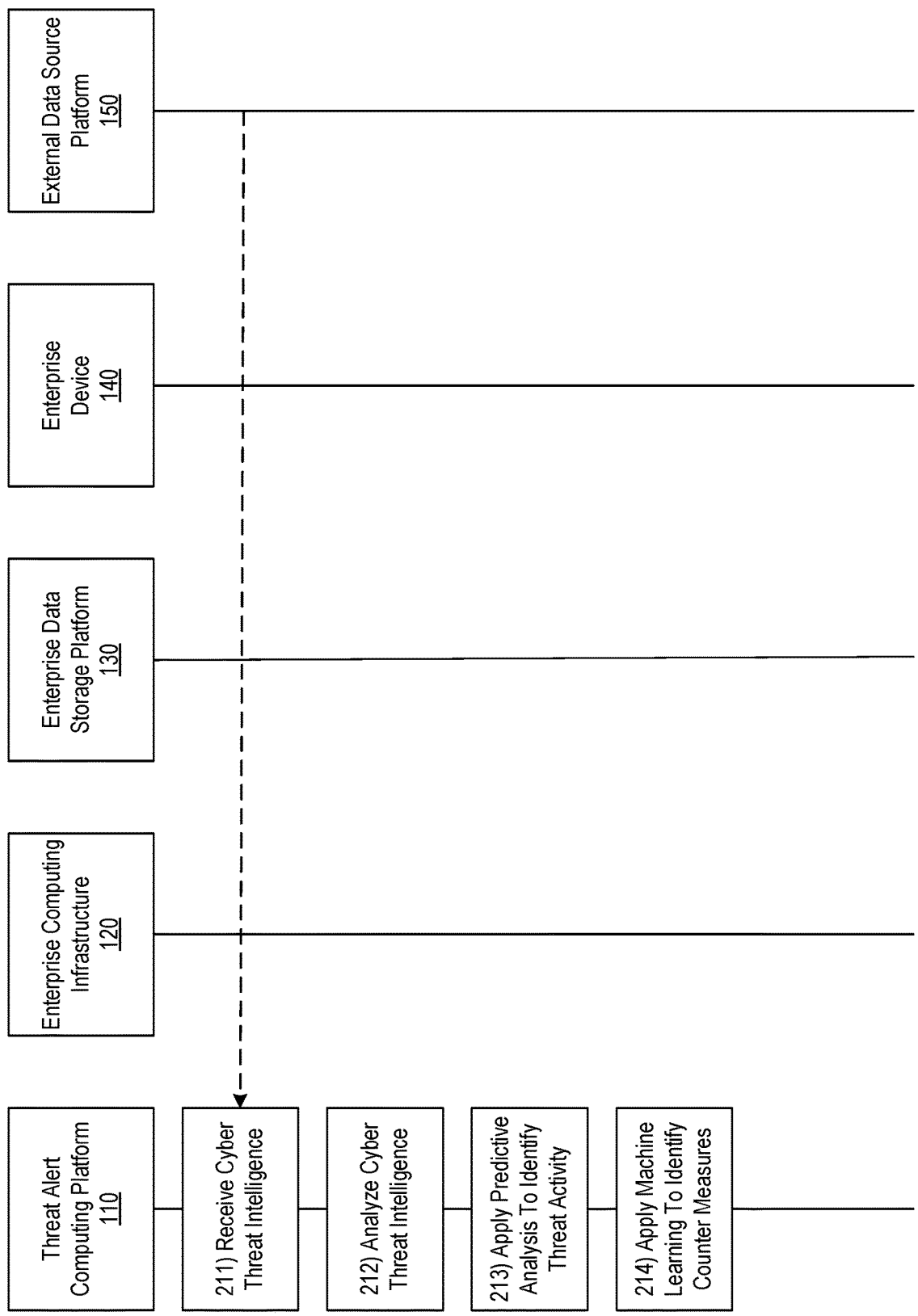

FIGS. 2A-2C depict an illustrative event sequence for improving user responses to cyber security threats in accordance with one or more example embodiments. Referring to FIG. 2A, at step 201, threat alert computing platform 110 may generate a test communication to simulate a potential cyber threat activity. A cyber threat activity may be any activity with malicious intent that emanates from the cyber space. For example, some enterprise organizations, such as financial institutions, are constantly targeted by hackers attempting to misappropriate confidential information related to customers. Financial institutions may manage information related to thousands of customers, and such malicious activity might pose a significant risk to customer data. Moreover, as enterprise applications are added, and hostile actors become more sophisticated, the potential for cyber threat activity increases significantly.

In many instances, a user of an enterprise resource may download a suspicious attachment in an electronic communication, and/or follow a link to an unauthorized web resource. Such activities may make the enterprise resources vulnerable to hostile actors and/or activities, and may also may be difficult to detect. Compromised enterprise accounts may potentially cause billions of dollars in loss to an enterprise organization, and/or compromise the security of customer confidential information. As enterprise organizations become more and more dependent on information technology infrastructures, any threat and/or disruption to such infrastructures may significantly undermine confidence in the enterprise organizations, and may negatively impact the reputation and goodwill of the enterprise organizations.

Enterprise organizations may respond to such potential cyber threat activities by adopting a variety cyber defense strategies. For example, an enterprise organization may simulate potential cyber threat activities so as to prepare and/or train employees prior to an actual cyberattack. In many instances, simulating a potential cyber threat activity may be an effective measure of employee threat awareness, and may identify target employees that may be susceptible to cyber threat activities. Such simulation of potential cyber threat activities may also allow an enterprise organization to train and monitor employees over a period of time, and ensure their compliance with organizational threat response strategies.

Accordingly, threat alert computing platform 110 may generate a test communication that emulates a cyber threat activity. The test communication may be in one of several forms. For example, the test communication may be an electronic mail, a telephone call, a text message, and so forth. Also, for example, the potential cyber threat activity may include one or more of a phishing activity, a smishing activity, a spear phishing activity, a vishing activity, a cloned phishing activity, and a whaling activity. Generally, a traditional phishing activity may be propagated in a form of electronic mails sent to multiple recipients (e.g., mass mailings). By increasing a number of recipients, a hostile actor sending the mass mails may increase a chance of one or more recipients being susceptible to the phishing activity.

For example, a hostile actor may send electronic mail communications to thousands of recipients, and the electronic mail may require the recipient to perform one or more activities. For example, the electronic mail may include an attachment and the recipient may be expected to open the attachment. In some instances, when an enterprise application is utilized to open an application, an unauthorized software (e.g., a virus) may be introduced into that application, thereby making the enterprise computing infrastructure (e.g., enterprise computing infrastructure 120) vulnerable to additional threats.

Also, for example, the electronic mail may include a link and the recipient may be expected to click the link to follow it to an unauthorized web resource. In some instances, when an enterprise application is utilized to open a link, an unauthorized software (e.g., a virus) may be introduced into that application, thereby making the enterprise computing infrastructure (e.g., enterprise computing infrastructure 120) vulnerable to additional threats. Also, for example, a recipient may be directed to a web resource that emulates an enterprise login page, and an unsuspecting recipient may be caused to reveal login credentials to the enterprise computing infrastructure (e.g., enterprise computing infrastructure 120). Accordingly, a hostile actor may gain entry to the enterprise computing infrastructure (e.g., enterprise computing infrastructure 120). As another example, the electronic mail may require the recipient to respond to the electronic mail, thereby verifying an email address, internet protocol ("IP") address, and so forth.

In some instances, the potential cyber threat activity may be a cloned phishing activity. A cloned phishing activity may be a version of a phishing activity. In such instances, a recipient may have received a legitimate electronic communication that was previously delivered. Such an electronic communication may have previously included an attachment and/or link. A hostile actor may have acquired access to the legitimate electronic communication, and may alter the content (e.g., an attachment and/or link) to emulate the original legitimate electronic communication. A recipient who has previously received such a legitimate electronic communication may not suspect that the communication may have been altered, and may open the attachment or click on the link again.

In some instances, the potential cyber threat activity may be a whaling activity. A whaling activity may be a version of a phishing activity. In such instances, recipients are generally high profile executives of an enterprise organization. For example, a whaling activity may target C-suite executives of an enterprise organization. Such executives may be asked to provide time-sensitive responses to electronic communications by providing sensitive information, signing documents, opening attachments to electronic mails, and so forth.

In some instances, the potential cyber threat activity may be a smishing activity. A smishing activity may be a version of a phishing activity. In such instances, a hostile actor may attempt to misappropriate personal information from a computing device via a text message. For example, a hostile actor may send a text message, where the text appears to come from a trusted source such a financial institution, an accountant, a personal investment manager, and so forth. The recipient may follow one or more response instructions in the text message and compromise the enterprise computing infrastructure (e.g., enterprise computing infrastructure 120).

In some instances, the potential cyber threat activity may be a vishing activity. A vishing activity may be a type of smishing activity where a hostile actor may attempt to retrieve personal information from a user over a telephone communication. For example, a hostile actor may pretend to be a debt collector, a tax department official, an employee of a charitable organization, an employee at a billing department of an enterprise organization, and so forth. The hostile actor, may for example, attempt to induce an individual to reveal sensitive personal information such as a date of birth, a social security number, a bank account and/or routing number, credit card information, and so forth.

In some instances, the potential cyber threat activity may be a spear phishing activity. A spear phishing activity may be a targeted form of a phishing activity or smishing activity, where recipients may be targeted based on one or more characteristics. For example, recipients may be targeted based on an affiliation to a specific enterprise organizations. For example, customers who visit a local pharmacy may be a target of a spear phishing activity. A hostile actor may, for example, emulate a payment website of the pharmacy, and induce customers to visit such a website to pay for their prescription medications. Also, for example, enterprise customers of financial institutions (e.g., a bank) may be a target of a spear phishing activity. A hostile actor may, for example, emulate a login website of the bank, and induce customers to visit such a website to enter login credentials.

In some embodiments, threat alert computing platform 110 may generate the test communication based on cyber threat intelligence information. Cyber threat intelligence information may be based on intelligence collected using a variety of different sources of information, such as, for example, open source intelligence, human intelligence, technical intelligence, financial intelligence, media intelligence, and/or intelligence from the deep and dark web. Cyber threat intelligence information may be collected, analyzed, researched, compiled, and/or stored in an external data source platform (e.g., external data source platform 150). Cyber threat intelligence information may encompass intelligence on cybercrimes, cyber espionage, industrial espionage, foreign state sponsored espionage and/or terrorism, and so forth. Threat alert computing platform 110 may retrieve information from the external data source platform (e.g., external data source platform 150) and may generate the test communication based on cyber threat intelligence information.

For example, the cyber threat intelligence information may indicate that a phishing activity involving mass electronic communications may be targeting financial institutions. Accordingly, threat alert computing platform 110 may generate the test communication to simulate such an electronic communication. As another example, cyber threat intelligence information may indicate that a vishing activity involving telephonic communications attempting to retrieve credit card information may be targeting financial institutions. Accordingly, threat alert computing platform 110 may generate the test communication to simulate such a telephonic communication.

At step 202, threat alert computing platform 110 may send, via the communication interface, the test communication to a user device associated with a target user. For example, threat alert computing platform 110 may send the test communication to a user device (e.g., enterprise device 140) associated with a target user. For example, threat alert computing platform 110 may send a simulated electronic mail communication to the target user. Also, for example, threat alert computing platform 110 may send a simulated text message to the target user. As another example, threat alert computing platform 110 may make a telephonic call to the target user by impersonating a hostile actor. In many instances, an enterprise organization may obtain appropriate permissions prior to sending such test communications. For example, similar to notifications for fire drills at enterprise facilities, an enterprise organization may send a communication to several users that they may be a recipient of a test communication.

In some embodiments, threat alert computing platform 110 may identify the target user based on historical responses to prior test communications. For example, threat alert computing platform 110 may maintain a repository of test communications, target users, and their responses, in an enterprise database (e.g., enterprise data storage platform 130). Based on such historical data, threat alert computing platform 110 may determine that certain users have a higher propensity to respond to suspicious communications, and may identify such users as the target users.

In some embodiments, threat alert computing platform 110 may identify the target user based on an analysis of cyber threat intelligence information. For example, threat alert computing platform 110 may analyze the cyber threat intelligence information and determine that users of an enterprise mobile application are a target of cyber threat activity. Accordingly, threat alert computing platform 110 may identify the target users to be the users of the enterprise mobile application. Also, for example, threat alert computing platform 110 may analyze the cyber threat intelligence information and determine that users residing in a particular geographical location are a target of cyber threat activity. Accordingly, threat alert computing platform 110 may identify the target users to be the users residing in the particular geographical location. As another example, threat alert computing platform 110 may analyze the cyber threat intelligence information and determine that users in certain management functional roles are a target of cyber threat activity. Accordingly, threat alert computing platform 110 may identify the target users to be the users in the certain management functional roles.

At step 203, threat alert computing platform 110 may receive, via the communication interface and from the user device, a response to the test communication. For example, threat alert computing platform 110 may detect that the target user has opened an attachment associated with the test communication. As another example, threat alert computing platform 110 may detect that the target user has clicked on a link included in the test communication. Also, for example, threat alert computing platform 110 may detect that the target user has been induced to provide sensitive information in response to the test communication.

In some embodiments, the test communication may be a web-based communication that includes a link to a web resource, and where receiving the response to the test communication may include detecting that the target user has clicked the link to the web resource. In some embodiments, threat alert computing platform 110 may cause the web resource to display a warning message intended to warn the target user that the target user may be susceptible to an unauthorized cyber threat activity.

In some embodiments, the test communication may be an electronic mail, and the response to the test communication may include detecting that the target user has deleted the electronic mail. For example, threat alert computing platform 110 may detect that the target user has complied with stated policies of the enterprise organization by successfully identifying the test communication as a potential cyber security threat activity. Accordingly, threat alert computing platform 110 may detect that the target user may have taken one or more safety measures, such as for example, deleting the electronic mail, not opening the electronic mail, not opening attachments included in the electronic mail, and so forth. In some embodiments, the response to the test communication may include detecting that the target user has not responded to the electronic mail.

In some embodiments, the test communication may be a telephone call, and the response to the test communication may include detecting that the target user has not responded to the telephone call. For example, threat alert computing platform 110 may detect that the target user has complied with stated policies of the enterprise organization by successfully identifying the test communication as a potential cyber security threat activity. Accordingly, threat alert computing platform 110 may detect that the target user may have taken one or more safety measures, such as for example, not responding to the telephone call, terminating the call after responding to it, not providing sensitive information over the telephone call, reporting details of the telephone call to the appropriate enterprise information technology personnel, and so forth.

At step 204, threat alert computing platform 110 may determine, based on the response, a threat awareness level for the target user, where the threat awareness level is indicative of a susceptibility of the target user to the potential cyber threat activity. For example, threat alert computing platform 110 may detect that the target user has complied with stated policies of the enterprise organization by successfully identifying the test communication as a potential cyber security threat activity. For example, as described herein, threat alert computing platform 110 may have detected that the target user may have taken one or more safety measures, such as for example, not responding to the telephone call, terminating the call after responding to it, not providing sensitive information over the telephone call, reporting details of the telephone call to the appropriate enterprise information technology personnel, and so forth. Also, for example, threat alert computing platform 110 may have detected that the target user may have taken one or more safety measures, such as for example, deleting the electronic mail, not opening the electronic mail, not opening attachments included in the electronic mail, and so forth. Accordingly, threat alert computing platform 110 may determine the threat awareness level for such a target user to be at a "High" level.

As another example, threat alert computing platform 110 may detect that the target user has not complied with stated policies of the enterprise organization by being unable to identify the test communication as a potential cyber security threat activity. For example, threat alert computing platform 110 may have detected that the target user had been induced to provide sensitive information in response to the test communication. In such instances, threat alert computing platform 110 may determine the threat awareness level for such a target user to be at a "Low" level.

Also, for example, threat alert computing platform 110 may determine, based on historical data, that certain users have a higher propensity to respond to suspicious communications, and may determine the threat awareness level for such a target user to be at a "Low" level. Likewise, threat alert computing platform 110 may determine, based on historical data, that certain users have a lower propensity to respond to suspicious communications, and may determine the threat awareness level for such a target user to be at a "High" level.

For example, threat alert computing platform 110 may determine that a target user is successfully able to identify test communications via electronic mails as a potential cyber security threat activity, but is unable to identify test communications via telephonic calls as a potential cyber security threat activity. In such instances, threat alert computing platform 110 may determine a threat awareness level for the target user to be at a "Medium" level.

In some embodiments, threat alert computing platform 110 may determine the threat awareness level based on a score associated with responses to test communications. For example, threat alert computing platform 110 may assign a score of "1" to a successful response to a test communication, and a score of "0" to an unsuccessful response to a test communication. The threat awareness level may then be determined as a cumulative score and/or normalized score of such scores over a time period (e.g., a year, 6 months, and so forth). In some embodiments, threat alert computing platform 110 may determine the threat awareness level based on a range of the cumulative scores. For example, normalized scores between 0 to 30 may be determined to be a "Low" score, normalized scores between 30 to 70 may be determined to be a "Medium" score, and normalized scores between 70 to 100 may be determined to be a "High" score.

In some embodiments, threat alert computing platform 110 may maintain a program to periodically notify target users about current and/or anticipated cyber threat activities. In some embodiments, threat alert computing platform 110 may send periodic test communications to continually assess susceptibilities of target users, and/or effectiveness of training programs to increase awareness to cyber threats. Accordingly, threat alert computing platform 110 may update a threat awareness level for target users based on responses to such periodic test communications. For example, threat alert computing platform 110 may determine that a target user at a "Low" threat awareness level is now successfully able to identify test communications via electronic mails as a potential cyber security threat activity. This may be a result of training programs directed at cyber security threats via electronic mails. Additionally, threat alert computing platform 110 may determine that the target user is still unable to identify test communications via telephonic calls as a potential cyber security threat activity. In such instances, threat alert computing platform 110 may update the threat awareness level for the target user from a "Low" level to a "Medium" level.

In some embodiments, threat alert computing platform 110 may update a threat awareness level for a target user based on a period of time. For example, threat alert computing platform 110 may determine that a target user has been successfully responding to test communications for a period of time (e.g., one year), and may accordingly update the threat awareness level for the target user from a "Low" level to a "Medium" level, or from a "Medium" level to a "High" level. Also for example, threat alert computing platform 110 may determine that a target user has been successfully responding to actual cyber threat activities for one year, and may accordingly update the threat awareness level for the target user from a "Low" level to a "Medium" level, or from a "Medium" level to a "High" level. In some instances, threat alert computing platform 110 may retrieve an existing threat awareness level from an enterprise database (e.g., enterprise data storage platform 130), update the threat awareness level, and store it in the enterprise database (e.g., enterprise data storage platform 130).

At step 205, threat alert computing platform 110 may send, to the target user and based on the threat awareness level, an alert notification to counter the cyber threat activity. For example, threat alert computing platform 110 may send an electronic mail to the target user informing the target user that they were unsuccessful in their response to the test communication, and direct the target user to one or more training resources.

In some embodiments, threat alert computing platform 110 may customize, based on a type of the cyber threat activity, the alert notification. For example, a medium for the alert notification may be customized based on whether the activity is a phishing activity, a vishing activity, a smishing activity, and so forth. Also, for example, the cyber threat activity may be a whaling activity, and the alert notification may be customized to target the higher level executives in an enterprise organization.

Referring to FIG. 2B, at step 206, threat alert computing platform 110 may receive, from the target user, an acknowledgement of receipt of the alert notification. For example, a target user may have been unsuccessful in their response to a test communication, and threat alert computing platform 110 may send the alert notification, and prompt the target user to acknowledge receiving the alert notification. Generally, such an acknowledgement may enable the target user to own responsibility for increasing their threat awareness levels by committing to complete one or more training resources.

At step 207, threat alert computing platform 110 may receive, from the target user, a confirmation of reading and understanding contents of the alert notification. For example, a target user may have been unsuccessful in their response to a test communication, and threat alert computing platform 110 may send the alert notification, and prompt the target user to acknowledge reading and understanding contents of the alert notification. Generally, such an acknowledgement may enable the target user to own responsibility for increasing their threat awareness levels by committing to complete one or more training resources.

At step 208, threat alert computing platform 110 may send, to the target user and based on the threat awareness level and during a predetermined period of time, additional test communications emulating additional unauthorized communications associated with additional potential cyber threat activities. For example, a target user may have been unsuccessful in their response to a test communication, and threat alert computing platform 110 may determine that the target user needs to be periodically assessed as to their threat awareness level. Also, for example, threat alert computing platform 110 may determine a threat awareness level of a target user to be "Low" or "Medium" and may determine that the target user needs to be periodically assessed as to their threat awareness level. Accordingly, threat alert computing platform 110 may send additional test communications emulating additional unauthorized communications associated with additional potential cyber threat activities.

In some embodiments, threat alert computing platform 110 may determine, based on the threat awareness level for the target user, a frequency of sending the additional test communications. For example, threat alert computing platform 110 may determine a threat awareness level of a target user to be "Low" and may determine that the target user needs to be periodically assessed as to their threat awareness level with a higher frequency (e.g., bi-weekly or monthly). Also, for example, threat alert computing platform 110 may determine a threat awareness level of a target user to be "Medium" and may determine that the target user needs to be periodically assessed as to their threat awareness level with a medium frequency (e.g., monthly, bi-monthly, quarterly). As another example, threat alert computing platform 110 may determine a threat awareness level of a target user to be "High" and may determine that the target user needs to be periodically assessed as to their threat awareness level with a low frequency (e.g., annually, bi-annually).

At step 209, threat alert computing platform 110 may determine that the threat awareness level associated with the target user is below a threshold during a period of time. For example, threat alert computing platform 110 may determine a threat awareness level of a target user to be "Low" for more than a prescribed amount of time. For example, despite repeated alert notifications, and/or training programs, a target user may not be successfully identifying potential cyber security activities, and/or may be repeatedly exposing enterprise infrastructures (e.g., enterprise computing infrastructure 120) to malicious activities. In some embodiments, the threshold may be prescribed based on a normalized score (e.g., a threshold score of 35 out of a normalized score of 100). For example, threat alert computing platform 110 may determine a threat awareness level of a target user to be "25" for more than a year, threat alert computing platform 110 may trigger one or more security measures based on such a low threat awareness level. In some instances, threat alert computing platform 110 may retrieve an existing threat awareness level from an enterprise database (e.g., enterprise data storage platform 130) to determine if the threat awareness level associated with the target user is below a threshold during a period of time.

At step 210, threat alert computing platform 110 may modify access permissions, applicable to the target user, to one or more enterprise resources. For example, threat alert computing platform 110 may modify access permission of the target user to access enterprise infrastructures (e.g., enterprise computing infrastructure 120). For example, threat alert computing platform 110 may cause the target user to change login credentials more frequently. As another example, threat alert computing platform 110 may disable the target user's ability to open attachments in the electronic messages. Also, for example, threat alert computing platform 110 may remove attachments from the electronic messages directed at the target user. As another example, threat alert computing platform 110 may disable the target user's ability to open links in the electronic messages. As another example, threat alert computing platform 110 may disable the target user's ability to visit certain web resources. Additional, and/or alternate security measures may be implemented. For example, threat alert computing platform 110 may modify access permissions of the target user to certain enterprise resources and/or enterprise applications. Such security measures may enable an enterprise organization to increase a security firewall, and/or minimize vulnerabilities associated with security loopholes emanating from the target user. In some embodiments, threat alert computing platform 110 may send instructions to various entities within the enterprise infrastructures (e.g., enterprise computing infrastructure 120) to execute a modification of access permissions. In some embodiments, threat alert computing platform 110 may store the access permissions in an enterprise database (e.g., enterprise data storage platform 130).

Referring to FIG. 2C, at step 211, threat alert computing platform 110 may receive cyber threat intelligence. As described herein, threat alert computing platform 110 may receive cyber threat intelligence from one or more sources (e.g., external data source platform 150). In some embodiments, threat alert computing platform 110 may receive strategic threat intelligence that may encompass conceptual abstracts of intelligence data, and/or analyses of enterprise activities, to identify sources and/or types of cyber threats. In some embodiments, threat alert computing platform 110 may receive tactical threat intelligence that may encompass appropriate enterprise network activity information. For example, threat alert computing platform 110 may receive cyber threat intelligence related to network intrusions in companies in a similar industry sector, and may adopt preventive measures to respond to such potential network intrusions targeting the enterprise infrastructures (e.g., enterprise computing infrastructure 120).

At step 212, threat alert computing platform 110 may analyze cyber threat intelligence information. For example, threat alert computing platform 110 may analyze strategic threat intelligence and determine cyber defense strategies that may facilitate effective responses by a target enterprise organization to mitigate the cyber threat. Also, for example, threat alert computing platform 110 may analyze tactical threat to identify threats and may cause an adoption of appropriate response strategies. For example, threat alert computing platform 110 may receive tactical threat intelligence related to network intrusions in companies in a similar industry sector, and threat alert computing platform 110 may cause an adoption of preventive measures to respond to such potential network intrusions targeting the enterprise infrastructures (e.g., enterprise computing infrastructure 120).

At step 213, threat alert computing platform 110 may apply, based on the analyzing, predictive analysis to identify anticipated cyber threat activity. Predictive analysis generally encompasses an array of statistical analyses techniques that include predictive models, machine learning models, data mining models, and so forth that may be utilized to make predictions about future cyber threat activities based on current and/or historical cyber threat activities. For example, threat alert computing platform 110 may gather data from cyber threat intelligence from one or more sources (e.g., external data source platform 150), retrieve historical data from an enterprise database (e.g., enterprise data storage platform 130), and apply statistical analyses to such data to validate the assumptions, hypothesis and test them using standard statistical models. Predictive modeling may be used for example, to identify a type of cyber threat activity (e.g., phishing, vishing, and so forth), a source of the cyber threat activity (e.g., domestic, foreign, competitor), a timing of the cyber threat activity (e.g., tax related phishing campaigns during tax season), potential vulnerabilities with an enterprise information technology resource network, and so forth. Also, for example, threat alert computing platform 110 may cause one or more security measures to be proactively applied prior to an actual cyber threat activity. For example, machine learning models may indicate a higher likelihood of a phishing activity via electronic mails, and threat alert computing platform 110 may cause additional filters to be applied to incoming electronic mails.

At step 214, threat alert computing platform 110 may apply machine learning techniques to identify effective strategies to counter cyber threat activities. For example, threat alert computing platform 110 may identify strategic decisions for deployment of enterprise resources, and/or allocation of security budgets, and/or personnel hiring, retention, and training. Also, for example, based on the machine learning models, threat alert computing platform 110 may cause an enterprise organization to design customized training programs. As another example, based on the machine learning models, threat alert computing platform 110 may cause an enterprise organization design more effective training programs based on a success rate of part training programs.

The techniques described herein are based on near-real time identification of events and devices associated with unauthorized activities, generation and sending of alerts and exchange of data and communications between devices over multiple communication channels. Such activities are enabled by at least the high bandwidth, low latency, high data transmission rates, and/or location accuracies associated with evolving high generation cellular networks (e.g., public network 160), that may optionally be configured for seamless communications with local networks, and/or private networks (e.g., private network 170).

Figure 3:
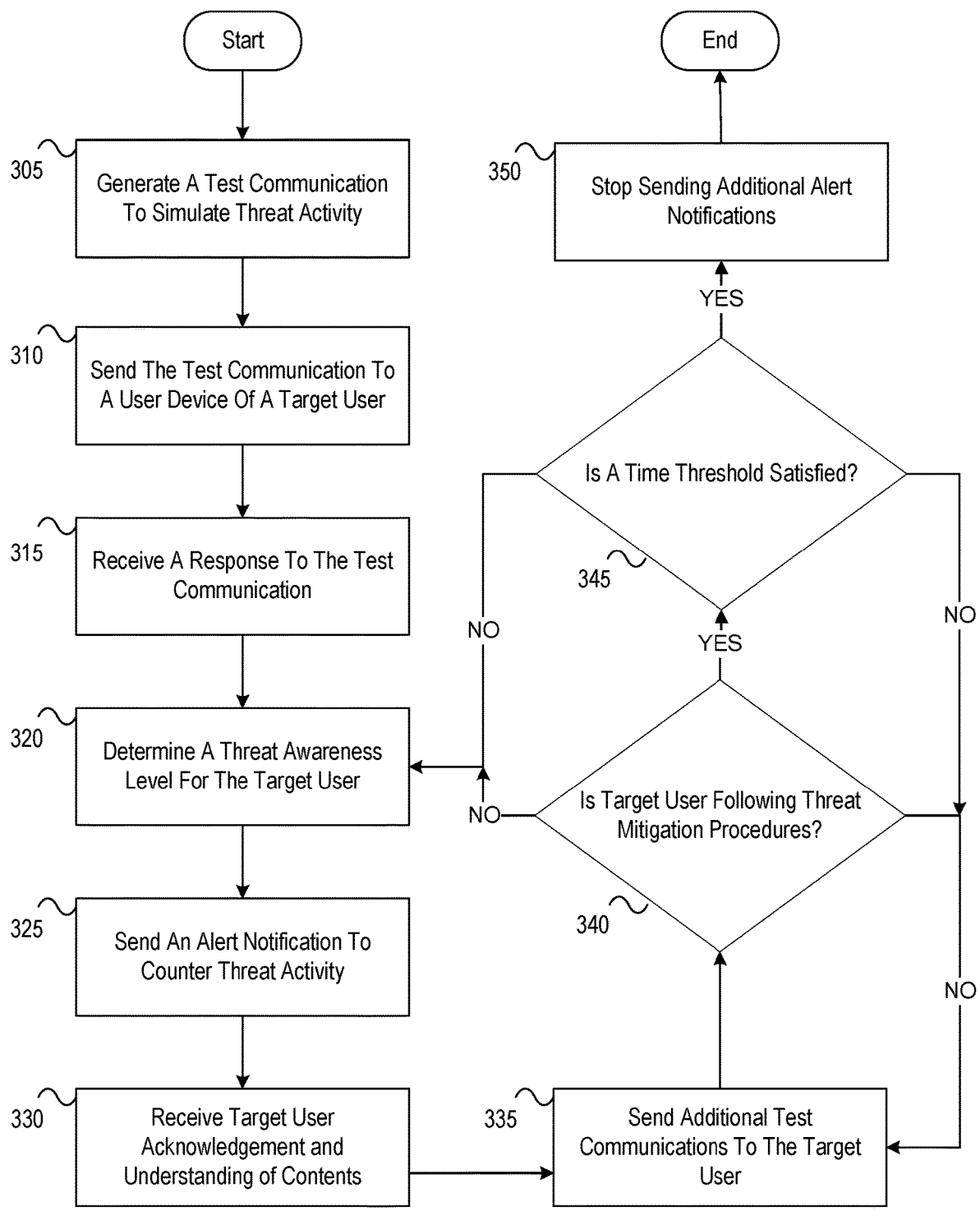
FIG. 3 depicts an illustrative method for improving user responses to cyber security threats in accordance with one or more example embodiments.

FIG. 3 depicts an illustrative method for improving user responses to cyber security threats in accordance with one or more example embodiments. Referring to FIG. 3, at step 305, a computing platform having at least one processor, a communication interface, and memory may generate a test communication to simulate a potential cyber threat activity. At step 310, the computing platform may send, via the communication interface, the test communication to a user device associated with a target user. At step 315, the computing platform may receive, via the communication interface and from the user device, a response to the test communication. At step 320, the computing platform may determine, based on the response, a threat awareness level for the target user, where the threat awareness level is indicative of a susceptibility of the target user to the potential cyber threat activity. At step 325, the computing platform may send, to the target user and based on the threat awareness level, an alert notification to counter the cyber threat activity. At step 330, the computing platform may receive, from the target user, an acknowledgement of receipt of the alert notification. Also, for example, at step 330, the computing platform may receive, from the target user, a confirmation of reading and understanding contents of the alert notification. At step 335, the computing platform may send, to the target user and based on the threat awareness level and during a predetermined period of time, additional test communications emulating additional unauthorized communications associated with additional potential cyber threat activities.

At step 340, the computing platform may determine if the target user is following threat mitigation procedures. If at step 340, the computing platform determines that the target user is not following threat mitigation procedures, then the process may return to step 320, and the computing platform may update, based on the response, a threat awareness level for the target user. In some embodiments, if at step 340, the computing platform determines that the target user is not following threat mitigation procedures, then the process may return to step 335, and the computing platform may continue to send, to the target user and based on, for example, an updated threat awareness level, and during an additional predetermined period of time, additional test communications.

If at step 340, the computing platform determines that the target user is following threat mitigation procedures, then the process may proceed to step 345. At step 345, the computing platform may determine if a time threshold is satisfied. If at step 345, the computing platform determines that the time threshold is not satisfied, then the process may return to step 320, and the computing platform may update, based on the response, a threat awareness level for the target user. In some embodiments, if at step 345, the computing platform determines that the time threshold is not satisfied, then the process may return to step 335, and the computing platform may continue to send, to the target user and based on, for example, an updated threat awareness level, and during an additional predetermined period of time, additional test communications.

If at step 345, the computing platform determines that the time threshold is satisfied, then the process may proceed to step 350. At step 350, the computing platform may stop sending the additional alert notifications.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits ("ASICs"), field programmable gate arrays ("FPGA"), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   generate a first test communication to simulate a potential cyber threat activity;
   send, via the communication interface, the first test communication to a user device associated with a target user;
   receive, via the communication interface and from the user device, a response to the first test communication;
   determine, based on the response, a threat awareness level for the target user from at least three levels, wherein the threat awareness level is indicative of a susceptibility of the target user to the potential cyber threat activity;
   send, to the target user and based on the threat awareness level, a first alert notification to counter the cyber threat activity;
   send, to the target user and based on the threat awareness level, a second test communication to the user device associated with the target user;
   in response to the sending the second test communication, when the target user is not following mitigation procedures:
   determine an updated threat awareness level;
   send, to the target user and based on the updated threat awareness level, a second alert notification to counter the cyber threat activity; and
   send, to the target user and based on the updated threat awareness level, a third test communication to the user device associated with the target user; and
   in response to sending the second test communication, when the target user is following mitigation procedures:
   when a time threshold is satisfied, stop sending subsequent alert notifications; and
   when the time threshold is not satisfied, send subsequent test communications to the user device associated with the target user.

2. The computing platform of claim 1, wherein the first test communication is a web-based communication that comprises a link to a web resource, and wherein receiving the response to the first test communication comprises detecting that the target user has clicked the link to the web resource.

3. The computing platform of claim 1, wherein the memory stores additional computer-readable instructions that, when executed by the at least one processor, cause the computing platform to:
   receive, from the target user, an acknowledgement of receipt of the first alert notification; and
   receive, from the target user, a confirmation of reading and understanding contents of the first alert notification.

4. The computing platform of claim 1, wherein the memory stores additional computer-readable instructions that, when executed by the at least one processor, cause the computing platform to:
   identify the target user based on historical responses to prior test communications.

5. The computing platform of claim 1, wherein the memory stores additional computer-readable instructions that, when executed by the at least one processor, cause the computing platform to:
   identify the target user based on an analysis of cyber threat intelligence information.

6. The computing platform of claim 1, wherein the memory stores additional computer-readable instructions that, when executed by the at least one processor, cause the computing platform to:

send, to the target user and based on the threat awareness level and during a predetermined period of time, additional test communications emulating additional unauthorized communications associated with additional potential cyber threat activities.

7. The computing platform of claim 6, wherein the memory stores additional computer-readable instructions that, when executed by the at least one processor, cause the computing platform to:
determine, based on the threat awareness level for the target user, a frequency of sending the additional test communications.

8. The computing platform of claim 1, wherein the memory stores additional computer-readable instructions that, when executed by the at least one processor, cause the computing platform to:
determine that the threat awareness level associated with the target user is below a threshold during a period of time; and
modify access permissions, applicable to the target user, to one or more enterprise resources.

9. The computing platform of claim 1, wherein the memory stores additional computer-readable instructions that, when executed by the at least one processor, cause the computing platform to:
customize, based on a type of the cyber threat activity, the first alert notification.

10. The computing platform of claim 1, wherein the first test communication is an electronic mail, and wherein the response to the first test communication comprises detecting that the target user has deleted the electronic mail.

11. The computing platform of claim 1, wherein the first test communication is an electronic mail, and wherein the response to the first test communication comprises detecting that the target user has not responded to the electronic mail.

12. The computing platform of claim 1, wherein the first test communication is a telephone call, and wherein the response to the first test communication comprises detecting that the target user has not responded to the telephone call.

13. The computing platform of claim 1, wherein the memory stores additional computer-readable instructions that, when executed by the at least one processor, cause the computing platform to:
generate the first test communication based on cyber threat intelligence information.

14. The computing platform of claim 1, wherein the memory stores additional computer-readable instructions that, when executed by the at least one processor, cause the computing platform to:
analyze cyber threat intelligence information; and
apply, based on the analyzing, predictive analysis to identify anticipated cyber threat activity.

15. The computing platform of claim 1, wherein the memory stores additional computer-readable instructions that, when executed by the at least one processor, cause the computing platform to:
apply machine learning techniques to identify effective strategies to counter cyber threat activities.

16. The computing platform of claim 15, wherein the memory stores additional computer-readable instructions that, when executed by the at least one processor, cause the computing platform to:
in response to the applying the machine learning techniques, affect a design of a customized training program for a plurality of users, wherein the customized training program is directed to increasing awareness to cyber threats for the plurality of users and wherein the plurality of users includes the target user.

17. The computing platform of claim 1, wherein the potential cyber threat activity comprises one or more of a phishing activity, a smishing activity, a spear phishing activity, a vishing activity, a cloned phishing activity, and a whaling activity.

18. The computing platform of claim 1, wherein the at least three levels comprise first, second, and third awareness levels and wherein the memory stores additional computer-readable instructions that, when executed by the at least one processor, cause the computing platform to:
when the target user successfully identifies both the first test communication and the second test communication as the potential cyber threat activity, categorize the threat awareness level for the target user as the first awareness level;
when the target user successfully identifies only one of the first and second test communications as the potential cyber threat activity, categorize the threat awareness level for the target user as the second awareness level; and
when the target user does not successfully identify the first and the second test communications as the potential cyber threat activity, categorize the threat awareness level for the target user as the third awareness level.

19. The computing platform of claim 1, wherein the at least three levels comprise first, second, and third awareness levels and wherein the memory stores additional computer-readable instructions that, when executed by the at least one processor, cause the computing platform to:
send a plurality of test communications to the target user over a time period;
obtain a cumulative score based on a plurality of responses from the target user to the plurality of test communications; and
identify the threat awareness level from the cumulative score.

20. The computing platform of claim 1, wherein the memory stores additional computer-readable instructions that, when executed by the at least one processor, cause the computing platform to:
assign a normalized score to the threat awareness level; and
when the normalized score is less than a predetermined threshold, modify access permissions for the target user based on the threat awareness level.

21. The computing platform of claim 1, wherein the memory stores additional computer-readable instructions that, when executed by the at least one processor, cause the computing platform to:
determine a selected frequency from a plurality of frequencies based on the threat awareness level; and
periodically assess the target user at the selected frequency.

22. A method, comprising:
at a computing platform comprising at least one processor, a communication interface, and memory:
generating a first test communication to simulate a potential cyber threat activity;
sending, via the communication interface, the first test communication to a user device associated with a target user;
receiving, via the communication interface and from the user device, a response to the first test communication;

determining, based on the response, a threat awareness level for the target user from at least three levels, wherein the threat awareness level is indicative of a susceptibility of the target user to the potential cyber threat activity;

based on the threat awareness level, sending, to the target user, a first alert notification to counter the cyber threat activity;

sending, to the target user and based on the threat awareness level, a second test communication to the user device associated with the target user;

in response to the sending the second test communication, when the target user is not following mitigation procedures:

determining an updated threat awareness level;

sending, to the target user and based on the updated threat awareness level, a second alert notification to counter the cyber threat activity; and sending, to the target user and based on the updated threat awareness level, a third test communication to the user device associated with the target user; and in response to sending the second test communication, when the target user is following mitigation procedures:

when a time threshold is satisfied, stop sending subsequent alert notifications; and when the time threshold is not satisfied, sending subsequent test communications to the user device associated with the target user.

23. The method of claim 22, further comprising:
analyzing cyber threat intelligence information; and
applying, based on the analyzing, predictive analysis to identify anticipated cyber threat activity.

24. The method of claim 22, further comprising:
determining that the threat awareness level associated with the target user is below a threshold during a period of time; and
modifying access permissions, applicable to the target user, to one or more enterprise resources.

25. One or more non-transitory computer-readable media storing instructions that, when executed by a computing platform comprising at least one processor, a communication interface, and memory, cause the computing platform to:

generate a first test communication to simulate a potential cyber threat activity;

send, via the communication interface, the first test communication to a user device associated with a target user;

receive, via the communication interface and from the user device, a response to the first test communication;

determine, based on the response, a threat awareness level for the target user from at least three levels, wherein the threat awareness level is indicative of a susceptibility of the target user to the potential cyber threat activity;

based on the threat awareness level, send, to the target user, a first alert notification to counter the cyber threat activity;

send, to the target user and based on the threat awareness level, a second test communication to the user device associated with the target user;

in response to sending the second test communication, when the target user is not following mitigation procedures:

determine an updated threat awareness level;

send, to the target user and based on the updated threat awareness level, a second alert notification to counter the cyber threat activity; and send, to the target user and based on the updated threat awareness level, a third test communication to the user device associated with the target user; and in response to sending the second test communication, when the target user is following mitigation procedures:

when a time threshold is satisfied, stop sending subsequent alert notifications; and when the time threshold is not satisfied, send subsequent test communications to the user device associated with the target user.

* * * * *